(12) United States Patent
Hanak

(10) Patent No.: US 6,277,265 B1
(45) Date of Patent: *Aug. 21, 2001

(54) APPARATUS AND METHOD FOR ELECTROCORIOLYSIS, THE SEPARATION OF IONIC SUBSTANCES FROM LIQUIDS IN THE ELECTRODYNAMIC MODE

(75) Inventor: Joseph J. Hanak, Ames, IA (US)

(73) Assignee: Apogee Corporation, Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,996

(22) Filed: Jul. 23, 1999

Related U.S. Application Data

(63) Continuation-in-part of application No. 09/228,432, filed on Jan. 11, 1999, now abandoned, which is a continuation of application No. 08/678,892, filed on Jul. 12, 1996, now Pat. No. 5,858,199.
(60) Provisional application No. 60/009,748, filed on Jan. 11, 1996, and provisional application No. 60/001,458, filed on Jul. 17, 1995.

(51) Int. Cl.[7] .......................................................... C02F 1/46
(52) U.S. Cl. .......................... 205/687; 205/688; 205/702; 205/742; 205/771; 204/242; 204/267; 204/269; 204/271; 204/272; 204/273; 204/275.1; 204/545; 204/660
(58) Field of Search .................................... 205/687, 688, 205/742, 702, 771; 204/242, 267, 269, 271, 272, 273, 275.1, 545, 660

(56) References Cited

U.S. PATENT DOCUMENTS

| | | |
|---|---|---|
| 1,230,524 | 6/1917 | Schwerin . |
| 1,558,382 | 10/1925 | Marx . |
| 2,854,393 | 9/1958 | Kollsman .............................. 204/180 |
| 2,854,394 | 9/1958 | Kollsman .............................. 204/180 |
| 3,099,615 | 7/1963 | Kollsman .............................. 204/180 |

(List continued on next page.)

FOREIGN PATENT DOCUMENTS

| | | |
|---|---|---|
| 41 41 345 A1 | 6/1993 | (DE) . |
| 7 404 745 | 10/1975 | (NL) . |

OTHER PUBLICATIONS

U. S. Department of Energy, Environmental Restoration and Waste Management Five–Year Plan, Fiscal years 1994–1998, Report No. DOE/S–00097P, vol. 1, Jan. 1993.

U. S. Department of Energy, Office of Technology Development, Fiscal Year 1993, Program Mid–Year Summaries Research, Development, Demonstration, Testing and Evaluation, Oct. 1993.

Gross, D.W. "Treatment Technologies for Hazardous Wastes" Part IV. A review of Alternative Treatment Processes for Metal Bearing Hazardous Waste Streams, Journal of the Air Pollution Control Association, 36(5):603–614 (1986). (ISSN No. 0002–2470.).

(List continued on next page.)

*Primary Examiner*—Arun S. Phasge
(74) *Attorney, Agent, or Firm*—Zarley, McKee, Thomte, Voorhees & Sease

(57) ABSTRACT

An apparatus and method for electrocoriolysis, the separation of ionic substances from liquids in the electrodynamic mode. The method maximizes centrifugal forces on a fluid contained in a chamber having oppositely polarized electrodes. A feed fluid is fed into the chamber. Spacing of the electrodes can be minimized for enhancement of the process. A constant voltage can be applied. Centrifugal force and the electric potential across the chamber create enhanced separation. Concentrated solution can be removed from a location in the chamber and depleted solution from another location.

56 Claims, 5 Drawing Sheets

U.S. PATENT DOCUMENTS

| | | | |
|---|---|---|---|
| 3,196,095 | 7/1965 | Wadsworth | 204/149 |
| 3,335,079 | 8/1967 | Nellen | 204/301 |
| 3,349,021 | 10/1967 | Brown et al. | 204/180 |
| 3,556,967 | 1/1971 | Anderson | 204/180 |
| 4,008,135 | 2/1977 | Gazda et al. | 204/149 |
| 4,017,390 | 4/1977 | Vicard | 210/42 R |
| 4,141,809 | 2/1979 | Aitchison et al. | 204/180 R |
| 4,203,818 | 5/1980 | Greaves | 204/268 |
| 4,432,849 | 2/1984 | Saito | 204/180 R |
| 4,440,616 | 4/1984 | Houseman | 204/275 |
| 4,623,436 | 11/1986 | Umehara | 204/149 |
| 4,726,904 | 2/1988 | Ayers | 210/658 |
| 4,762,597 | 8/1988 | Scott | 204/273 |
| 4,769,119 | 9/1988 | Grundler | 204/149 |
| 4,956,071 | 9/1990 | Giuffrida et al. | 204/301 |
| 5,004,531 | 4/1991 | Tiernan | 204/273 |
| 5,082,541 | 1/1992 | Watson | 204/180.1 |
| 5,094,739 | 3/1992 | Kump | 204/150 |
| 5,154,809 | 10/1992 | Oren et al. | 204/182.4 |
| 5,183,546 | 2/1993 | Oren et al. | 204/290 R |
| 5,288,373 | 2/1994 | Yang | 204/131 |
| 5,384,685 | 1/1995 | Tong et al. | 361/503 |
| 5,425,858 | 6/1995 | Farmer | 204/149 |
| 5,464,453 | 11/1995 | Tong et al. | 29/25.03 |
| 5,858,199 * | 1/1999 | Hanak | 205/687 |

OTHER PUBLICATIONS

Peters, Robert W. and Ku, Young, in Separation of Heavy Metals and Other Trace Contaminants, Robert W. Peters and B. Mo Kim, eds., Amer. Inst. of Chem. Engineers, Symposium Series 243, vol. 81, p. 165 (1985).

Freeman, Harry M., Standard Handbook of Hazardous Waste Treatment and Disposal, editor, U. S. Environmental Protection Agency, McGraw–Hill Book Company, New York (1989).

Evaluation of Management Practices for Mine Solid Waste Storage, Disposal, and Treatment, vol. 2, prepared by PEI Associates, Inc. Concinnati, OH (formely PEDCo Environmental, Inc.) for the U. S. EPA Office of Research and Development, Cincinnati, OH, (1983).

Brooks, Clyde C., Metal Recovery from Industrial Waste, Lewis Publishers, Inc., Chelsea, MI (1991) no month.

Aguwa, Aloysius, A. and Charles N. Haas, "Electrolytic Recovery Techniques," in Ref. 3. p. 6.39 (no date).

Pemsler, J. P. and A. S. Rappas, "Metal Recovery from Solutions by Selective Reduction of Metal Ions," pp. 135–158, in Recent Developments in Separation Science, vol. 5, N. N. Li, ed., CRS Press, West Palm Beach, FL. (1979) no month.

Benirati, C. A. and W. J. McLay, "Electrolytic Metal Recovery Comes of Age," Plating and Surface Finishing, Mar. 1993, p. 26.

Farkas, J., and G. D. Mitchell, in Separation of Heavy Metals and Other Trace Contaminants, Robert W. Peters and B. Mo Kim, eds., Amer. Inst. of Chem. Engineers, Symposium Series 243 in Ref. 17, p. 57. (no date).

Campbell, M. E. and W. M. Glenn, A Guide to Industrial Waste Reduction and Recycling, Pollution Probe Foundation, Toronto, Canada (1982) no month.

U. S. Environmental Protection Agency, Development Document for Existing Sourced Pretreatment Standards for the Electroplating Point Source Category, EPA 440/1–79/003, Washington, D. C., Aug. 1979, p. 204.

Bier, Milan, Electrophoresis: Theory, Methods and Applications, Academic Press (1967) no month.

Frilette, Vincent, J., J. Phys. Chem. 61, 168–174 (1957) no month.

Murphy, George W., J. Electrochem. Soc. 97, 405–413 (1950) no month.

Shaffer, L. H. and M. S. Mintz, in Principles of Desalination, Second Edition, Part A, K. S. Spiegler and A. D. K. Laird, Editors, Academic Press, 263–354 (1980) no month.

P. M. Wild and G. W. Vickers, "The Technical and Economic Benefits of Centrifugal Reverse Osmosis Desalination," Desalination 89, 33–40 (1992) no month.

Y. Oren and A. Soffer, "Electrochemical Parametric Pumping," J. Electrochem. Soc.: Electrochemical Science and Technology 125, 869–875 (1978) no month.

Y. Oren and A. Soffer, "Water desalting by means of electrochemical parametric pumping. I. The equilibrium properties of a batch unit cell," Journal of Applied Electrochemistry 13, 473–487 (1983) no month.

Y. Oren and A. Soffer, "Water desalting by means of electrochemical parametric pumping. II. Separation properties of a multistage column,", Journal of Applied Electrochemistry 13, 489–505 (1983) no month.

"SDI 'Supercapacitors' to See Civilian Applications," edited by P. Hamilton, Science 255, 787, Feb. 1992.

Conway, B. E., "Transition from 'Supercapacitor' to 'Battery' Behavior in Electrochemical Energy Storage," J. Electrochem. Soc. 138, No. 6, 1539 (1991) no month.

Koresh J. and A. Soffer, Double Layer Capacitance and Charging Rate of Ultramicroporous Carbon Electrodes, ibid., 124, No. 9, 1379 (1977) no month.

Tanahashi Ichiro, A. Yoshida and A. Nishino, "Electrochemical Characterization of Activated Carbon–Fiber Cloth Polarizable Electrodes for Electric Double–Layer Capacitors," ibid., 137, No. 10, 3052 (1990).34, no month.

Gagnon, E. G. "The Triangular Voltage Sweep Method for Determining Double–Layer Capacity of Porous Electrodes," ibid., 122, No. 4, 521 (1975) no month.

"Laboratory Deionization Technology May Herald Low Cost Sea Water Desalination and Waste Water Treatment," News Release, Lawrence Livermore National Laboratory, Dec. 20, 1994.

* cited by examiner

APPARATUS AND METHOD FOR ELECTROCORIOLYSIS, THE SEPARATION OF IONIC SUBSTANCES FROM LIQUIDS IN THE ELECTRODYNAMIC MODE

CROSS-REFERENCE TO RELATED APPLICATIONS AND INCORPORATION BY REFERENCE

The present application is a continuation-in-part of U.S. Ser. No. 09/228,432, filed Jan. 11, 1999, now abandoned which is a continuation of U.S. Ser. No. 08/678,892, filed Jul. 12, 1996, now U.S. Pat. No. 5,858,199, issued to Joseph J. Hanak, on Jan. 12, 1999, which is incorporated by reference in its entirety and which was based on U.S. provisional Ser. No. 60/001,485, filed Jul. 17, 1995 and U.S. provisional Ser. No. 60/009,748, filed Jan. 11, 1996.

FIELD OF THE INVENTION

This invention relates generally to an improved device and method for separating and removing ionizable components dissolved in fluids, such as for example, water. Particularly, this invention relates to separating said ionizable substances into fractions by the action of electric current and of Coriolis force. More particularly, the invention relates to a rotary device and a process in which a liquid containing ionizable components is continuously fed in and the purified solvent and the solute in a concentrated solution are continuously removed. Still more particularly, the invention relates to a rotary device and a process in which said ionizable substances are separated in one of three modes, the modes being electrolytic, electrostatic, and electrodynamic. Most particularly, this invention relates to the electrodynamic mode, hereafter referred to as the ELDYN mode.

BACKGROUND OF THE INVENTION

U.S. Pat. No. 5,858,199, hereafter referred to as the Hanak patent, contains the description of apparatus and method for a water deionization process named Electrocoriolysis, also referred to as the ELCOR™ process. The background of the invention that appears in the Hanak patent, contains a detailed description of the electrolytic and the electrostatic modes, which is also relevant to the instant invention. It should be noted that the term 'electrostatic' in this description refers to a deionization process assisted by gravitational or centrifugal forces, while the term 'capacitive' refers to a deionization process not involving said forces; otherwise both the electrostatic and capacitive processes involve capacitive charging and discharging of the electrodes. Additional background information, which applies to the ELDYN mode, follows.

While conducting tests using a dynamic Electrogravitational (EG) deionization device operating in the electrostatic mode, a new, previously unknown mode, co-existing and competing with the electrostatic mode has been discovered. As stated above, this new mode was named electrodynamic mode, or ELDYN mode. It was observed that unlike in the capacitive method of prior art [References 1, 2, 3], deionization and enhancement in the electrostatic mode were occurring simultaneously and continuously with the newly discovered ELDYN mode, solely by the combined action of an electrostatic field and gravitational force. On account of the fact that this new phenomenon had an implication of potential large gains in the throughput and energy efficiency of the water treatment process, an extensive examination of the results was undertaken to determine the mechanism of the ELDYN mode.

Evidence for the Existence of the ELDYN Mode of Deionization

The preceding test data indicate that the ELDYN mode occurs simultaneously with the electrostatic mode. The two appear to be competing processes. The occurrence of the ELDYN mode has been inferred from the mechanism previously known to be taking place in the capacitive mode of prior art [References 1, 2, 3], from three observations obtained in the study of EG deionization in the electrostatic mode, and from the first successful deionization using the ELCOR™ process operating in the electrostatic mode.

(a) Mechanism of Deionization in the Capacitive Method

Oren and Soffer [Ref. 1, 2], in describing their deionization process by 'electrochemical parametric pumping' that appears to be the original version of the capacitive method of deionization, observe that "almost all of the electric charge is directed to change NaCl concentration." Farmer [Ref. 3], in his patent on a capacitive method of deionization, reported that deionization occurs only during charging, and enhancement occurs only during discharging. There was no provision in either case for Earth's gravity to assist deionization.

(b) Evidence from Simultaneous Deionization and Enhancement

The first piece of evidence, from FIG. 10 in the Hanak patent, reproduced herein as FIG. 1, is that during a voltage pulse commencing at ~1350 s and ending at ~4000 s, as well as during subsequent pulses, a high rate of deionization and enhancement were taking place simultaneously during the charging process, shown by the increasing voltage. Whereas deionization is expected during charging, enhancement is not expected until the polarity reversal, when capacitor discharge and the release of accumulated ions occur, as described in (a) above. We postulate that the simultaneous occurrence of enhancement is the consequence of the presence of the electrical double layer at the electrode surfaces, shown in FIG. 2 [Ref. 4]. The diffuse layer in the double layer contains elevated concentration of solvated ions having polarity opposite that of the electrode, rendering the solution in it more dense. Under the influence of gravitational or centrifugal force, the diffuse layer slides in the direction of this force, like an avalanche, along the surface of the electrode, while being held close to it by electrostatic force, resulting in the observed enhancement at the bottom of a stationary cell or the outer periphery of a rotating cell. The water molecules between the electrode and the diffuse layer act as a lubricant for this sliding motion. At the same time, the partially depleted solution between the electrodes moves in the direction opposite to the gravitational or centrifugal force to cause the observed depletion at the top of a stationary cell or near the hub of a rotating cell. This process constitutes a 'leaky' capacitor. Current must be constantly supplied to make up for the ions removed from the electrode surfaces. This current is in addition to the capacitive charging current.

This postulated mechanism for the ELDYN mode implies that in the ELCOR™ process, in which centrifugal force is used, which can be made much greater than the gravitational force, the diffuse layer will be removed by the sliding action at a much greater rate, causing the ELDYN mode to predominate over the electrostatic mode.

(c) Evidence from the Duration of the Current Pulse

The second piece of evidence is the duration of the current pulse at the same, constant level of current, I, for different chemical species. This mode of charging is referred to as the 'current step' method, in which the potential, E, across the electrodes increases linearly with time, t, according to the equation:

$$E = I(R_s + t/C_d),\qquad\text{Eq. 1}$$

where $R_s$ is the resistance in the electrolyte [Ref. 4] and $C_d$ is the double-layer capacitance. With the same set of electrodes, the charging time, t, should be the same to reach the same potential, E. Yet, in FIG. 9 in the Hanak patent, reproduced here as FIG. 3 and in FIG. 1, the average length of the current pulses were 870 s. (0.24 h) and 2390 s. (0.66 h) for $CaCl_2$ and $H_2SO_4$, respectively, both at a concentration of 0.01 M. Thus, the total charge transported in the case of sulfuric acid was 2.75 times greater. The flow rates of the feed were similar. If the electrostatic mode alone were operative, the total charge transported would have to be similar.

With a solution of NaCl at a concentration of 0.001 M and at a low current of 17.5 mA, pulse length of up to 3.62 h was observed, which exceeds by far the time required to charge the electrodes capacitively to the maximum preset voltage.

(d) Evidence from Constant Levels of Deionization and Enhancement

The third piece of evidence can be seen again in FIG. 1, where nearly constant and similar levels of deionization and enhancement are maintained over the greater part of each pulse. This result is consistent with a constant, high 'leakage current' arising from the sliding diffuse layers. Similarly, in the 0.001 M NaCl case above, constant levels of deionization and enhancement of about 50% and 150%, respectively, have been observed for over three hours in each pulse.

(e) Evidence from the First Successful Deionization Using the ELCOR™ Process Operating in the Electrostatic Mode A complete discussion of this evidence is presented in the Section entitled "Example."

Process Parameters Affecting the Deionization Process

The following parameters have been identified as being likely to affect deionization in the ELDYN mode.

Centrifugal Force. This is the prime independent parameter expected to give rise to the ELDYN mode and to have profound, beneficial effects on the process current, rate of deionization, Faradaic and energy efficiency, and the ultimate level of water purity. The rate of sliding and removal of the densified, diffuse layer is expected to be directly proportional to the magnitude of the G force generated by the Coriolis force, which creates 'outward' force on said layer, thereby setting it in sliding motion. The resulting continuous removal of the diffuse layer facilitates maintaining the state of charge or polarization of the electrodes at a low level and the voltage across the electrolyte at a high value. This condition, in turn, favors high current and faster ionic transport across the cell width.

Electric Field. The rate of ionic transport across the cell is directly proportional to the electric field, which is the second of two key parameters affecting the ELDYN mode. A maximum limiting voltage, just below the decomposition potential for the electrolyte (ca. 1.1 V), can be used for the process.

Another parameter for maximizing the electric field is the electrode spacing, as discussed further on.

Surface Area of the Electrodes. As in the case of the electrostatic mode, the HSA electrodes are a pre-requisite for maintaining high current density and, thereby, high rate of deionization. In combination with sufficient centrifugal force, HSA electrodes produce a condition of constant, high, dc current at a constant maximum voltage to facilitate a continuous operation without the need of changing polarity.

Supercapacitor electrodes such as those described in the Hanak patent, employed in the electrostatic mode, can be used.

Flow Rate of the Feed Liquid. The flow rate of the feed liquid affects enhancement and depletion; the ratio of the two quantities is the separation ratio. To date the limit of this ratio for a single stage has not been established. Its magnitude is expected to determine the number of stages in a multi-stage device to achieve a desired degree of deionization and enhancement.

Ratio of the Effluent Flow Rates. In order to achieve a cost-effective disposal or recovery of the dissolved solute, it should be concentrated into a minimal practical volume. For this purpose, the ratio of the flow rate of the diluent and the concentrate (Rd/Rc) should be substantially greater than 1, perhaps as large as 10 or more. An additional benefit from the high ratio is a substantial increase in the volume of the purified diluent.

Concentration of the Solute. The concentration of the feed affects the efficiency of water-treatment processes. As reported in the Hanak patent, the range of concentration selected for the initial feed has been shown to span over a range of over three orders of magnitude, from 0.0001 to 0.3 M, corresponding to ca. 10 to 30,000 mg/L for selected solutes.

Temperature. Elevated temperature, by promoting molecular motion and lowering surface tension and intermolecular cohesion, may favor the ELDYN mode in a manner similar to electrolytic processes. Maintaining a constant temperature would minimize the effect of this variable.

Ionic Properties as Process Parameters

In addition to the preceding process parameters, the following materials' parameters are expected to affect deionization in this mode.

Ionic Mass. Ionic transport is inversely proportional to the ionic mass, slowing down the heavy ions. However, the rate of sliding and removal of the densified, diffuse ionic sheath should be also proportional to the ionic mass. In turn, it should help maintain a low state of polarization and high electric field, enhancing the transport of the heavy ions across the cell. Thus, high ionic mass should be an important factor in the deionization of heavy ions, such as those of the transuranic elements.

Ionic Radius. The transference number is inversely proportional to the ionic size, meaning slower transit between electrodes. This condition is in part compensated for by a lower state of electrode polarization resulting from a relatively lower population of the ions on the electrode surfaces because of their large size. Furthermore, large ionic size also results in diminished ionic charge density, which would promote sliding. Thus, on balance, large ionic size is expected to favor the ELDYN mode.

Ionic Valence. A major impact on ionic transport is that the transport current required is directly proportional to ionic valence. In addition, increased charge on multivalent ions should result in greater attraction to the electrode and possibly an increase in the 'braking' action to sliding. On the other hand, greater charge on the cations leads to higher solvation, making the ion larger, with a resulting positive, offsetting effect discussed above.

Dependent Process Parameters

The dependent process parameters are the process current and the three conductivities for determining concentrations of the feed and the effluents. All are monitored in real time, along with the process voltage, an independent parameter. It should be noted that in the case of the electrolytic and electrostatic modes, the process current, set to a constant level, was an independent process parameter. In the ELDYN mode it is more advantageous for the current to be a parameter dependent on other variables such as centrifugal force and electric field.

TABLE 1

List of Computed Deionization Performance Parameters

| Acronym | Parameter | Units |
| --- | --- | --- |
| AVIP | Average process current | MA |
| DSO | Observed relative deionization | % |
| ONH | Observed relative enhancement | % |
| DST | Theoretical relative deionization | % |
| TNH | Theoretical relative enhancement | % |
| FEFD | Faradaic deionization efficiency | % |
| FEFC | Faradaic enhancement efficiency | % |
| SEP | Separation ratio (ONH/DSO) | — |
| KGKWH | rate of mass removal per unit of energy | kg/kWh |
| ENERW | energy per unit volume of water desalinated | kWh/m$^3$ |
| COSTW | cost per unit volume of water desalinated | \$/m$^3$ |
| COSTCP | cost per unit mass of chemical compound recovered | \$/kg |
| COSTR | cost per unit mass of metal ion or anion recovered | \$/kg |

Computed Performance Parameters

Formulas and software have been developed for computing deionization performance parameters. The software provides for continuous monitoring of the independent and dependent parameters during the process. The performance data are based on the starting concentration of the feed, the observed concentrations of the effluents, and other dependent and independent process parameters. The concentrations can be determined conductometrically from the expression log C=a log K+b, where C is the concentration, K is the conductivity, and a and b are constants characteristic of each material. A temperature correction to a common temperature is accomplished automatically by the conductivity meter. A list of deionization parameters that are computed and tabulated automatically at the end of each waste-water-treatment run appears in Table 1. They serve as the data base for evaluating the technical and economic merits of the process.

Predicted High Efficiency of Deionization in the ELDYN Mode

When the ELCOR™ process can be made to operate predominantly in the ELDYN mode, by substantially increasing the centrifugal force, the energy efficiency, rate of deionization, and cost-effectiveness will rival those of any other process. Consequently, a system design and operational features anticipated for the ELDYN mode can be incorporated into the ELCOR™ process disclosed in the Hanak patent. The ultimate goal will be to develop the most efficient and cost-effective process for the remediation of water resources which have been adversely affected by environmental pollution—including toxic wastes and radionuclides. The process will be also equally suitable for the treatment of water containing high levels of naturally occurring dissolved solids such as deep-well or brackish water.

The basis for the predicted high efficiency of deionization is as follows. First of all, there is a set quantity of energy associated with the removal of a solute from the feed solution, which is equivalent for all demineralization processes. Hence, this energy will not be considered in the comparison of the ELCOR™ process with other processes. For the ELCOR™ process operating in the electrolytic and electrostatic modes, it has been demonstrated that the energy efficiency is equal to or exceeds those of reverse osmosis (RO) and of electrodialysis (ED), not taking into account the energy required to run the centrifuge. (For large systems, centrifugation is estimated to be a small fraction of the total energy.) The energy expended in the electrolytic mode is mainly the sum of the resistive loss in the electrolyte, $I^2R$, where I is the electric current and R is the electrical resistance of the process liquid, plus the energy consumed by the electroplating and stripping operations. In the electrostatic mode it is again the $I^2R$ loss plus the energy consumed by the capacitive charging and discharging. The results also indicate that the electrostatic mode is more energy-efficient than the electrolytic mode. In the ELDYN mode at steady state, when additional charging is no longer occurring, the sole source of expended energy is the $I^2R$ component (again ignoring centrifugation). The ions arriving at the electrodes are simply balanced by those leaving the electrodes by the sliding action due to the centrifugal force. Thus, in the absence of the electrochemical components of energy loss, the process is more efficient in the ELDYN mode and also more efficient than RO or ED.

Operating Procedure for Deionization in the ELDYN Mode

The existing operating procedure used in the electrostatic mode employs constant current, which is an independent parameter in the Hanak patent. In that method, switching of polarity occurs when the limiting voltage is reached. A new, improved procedure employs constant voltage as an independent parameter. The process current is now a parameter that is dependent directly on the electric field and indirectly on the centrifugal force. As stated above, it is anticipated that in the ELDYN mode the current will saturate at a constant level proportional to the electric field and the centrifugal force, in addition to the ionic concentration in the feed. The software for process control and for evaluation requires appropriate modifications to accommodate this change.

As detailed in the Section entitled "Example" the data in FIG. 6 indicate that in the first part of each pulse, at lower voltage, charging of the electrodes is predominantly taking place, meaning that the electrostatic mode prevails. In the second part of the pulse, at higher voltage, it is clear that the ELDYN mode predominates, judging from the emergence of extensive concentration. This sequence of occurrence of the electrostatic and the ELDYN modes suggests that the HSA electrodes need to be at least partially populated by ionic species in order for significant rate of sliding of the ionic sheath to take place. The logic of this conclusion follows from the fact that the initially thin ionic sheath is more strongly attracted to the oppositely charged electrode surface than the subsequent thicker sheath. In the latter, additional ionic species can slide with relative ease over ions of the same polarity which are attracted more strongly to the electrode surface. The partial population of the electrode surface occurs automatically upon the application of voltage to discharged electrodes; requiring no additional provision for the ELDYN mode to occur.

A need for periodic, infrequent change in polarity of the electrodes is anticipated in order to clean the electrodes possibly soiled by microscopic solid matter, attracted to the surface. The intervals between such polarity reversal might be hours, days or weeks, if at all, most likely dependent on the quality of the feed liquid.

It should be pointed out that operation at a constant voltage is used in the capacitive deionization taught by Joseph Farmer in prior art [Ref 3]. However, in that process the current is not constant; it rises to a high value upon initial application of the voltage, and decreases asymptotically to a very low value with time, whereupon the electrodes must be discharged and regenerated. With the decrease of current the rate of deionization also decreases. As already stated, in the ELCOR™ process using the ELDYN mode a high, constant level of current persists, with no need to discharge the electrodes or switch polarity except for optional, occasional cleaning. Thus, the performance characteristics of the instant invention are superior to those of the Farmer patent.

BRIEF DESCRIPTION OF THE DRAWINGS

(FIG. 1 is the same as FIG. 10 in the Hanak patent).

(FIG. 3 is the same as FIG. 9 in the Hanak patent).

FIG. 4 is analogous to FIG. 2C in the Hanak patent, with an added feature of having an array of dot or rod insulating spacers arranged in a close-packed hexagonal pattern to maintain even spacing of the electrodes.

DETAILED DESCRIPTION OF THE PREFERRED EMBODIMENTS

The ELCOR™ equipment used for deionization in the ELDYN mode may be identical to that used in the electrostatic mode described in the Hanak patent. For optimum performance the equipment may incorporate one or more of the following enhancements.

Reduction of the Electrode Spacing.

Spacing between the electrodes is discussed in the Hanak patent. In the electrostatic mode periodic reversal of polarity is required when maximum voltage is reached. Upon polarity reversal the ion sheath, which is attracted to the electrode during charging, is released and starts diffusing away from the electrode and can mix partially with the depleted liquid. In order to prevent substantial mixing of the concentrate and the diluent it is important to provide sufficient electrode spacing and also to employ sufficiently high centrifugal force to sweep the ion sheath and the depleted liquid rapidly into their respective exhaust ports.

In the ELDYN mode it is anticipated that the process will operate at a steady state at a constant voltage and essentially at constant current, without polarity switching, except for possible occasional cleaning of the electrodes. In the absence of frequent polarity reversals, the ion sheath remains attracted close to the electrode and will not diffuse away from the electrodes to cause mixing of the concentrated solution and the diluent. Consequently, the spacing between the electrodes may be made smaller than in the electrostatic mode, thereby decreasing the transit time of the ions and increasing the performance parameters. The minimum spacing could be estimated from the thickness of the diffuse layers at the surface of the electrodes and from the ratio of the diluent and the concentrate flow rates. Thus, if the thickness of each diffuse layer is 1 nm and said ratio is 20, then the minimum cathode to anode spacing would be 42 nm. In practice, considerably larger spacing would be used to allow for sufficiently high flow rates. While there is no apparent limit for maximum spacing, in practice it would be dictated by practical levels of deionization, concentration and throughput, which decrease with increasing spacing. A practical, minimum spacing and means of achieving it could be that used in supercapacitors as described below.

Use of Insulating Spacers in between the Electrodes

Electrode spacers can be used in the form of insulating dots to keep the electrodes apart to help decrease the electrode spacing without risking the electrodes touching each other and to maintain uniform spacing. A method of forming such dots on the surface of supercapacitor electrodes and their use in supercapacitor devices is described by Tong et al. [Ref. 5 and 6]. The dots consist of organic epoxide polymer, about 25 to 31 µm (micrometers) in height and printed over a square grid about 1 mm apart.

Figure 2:
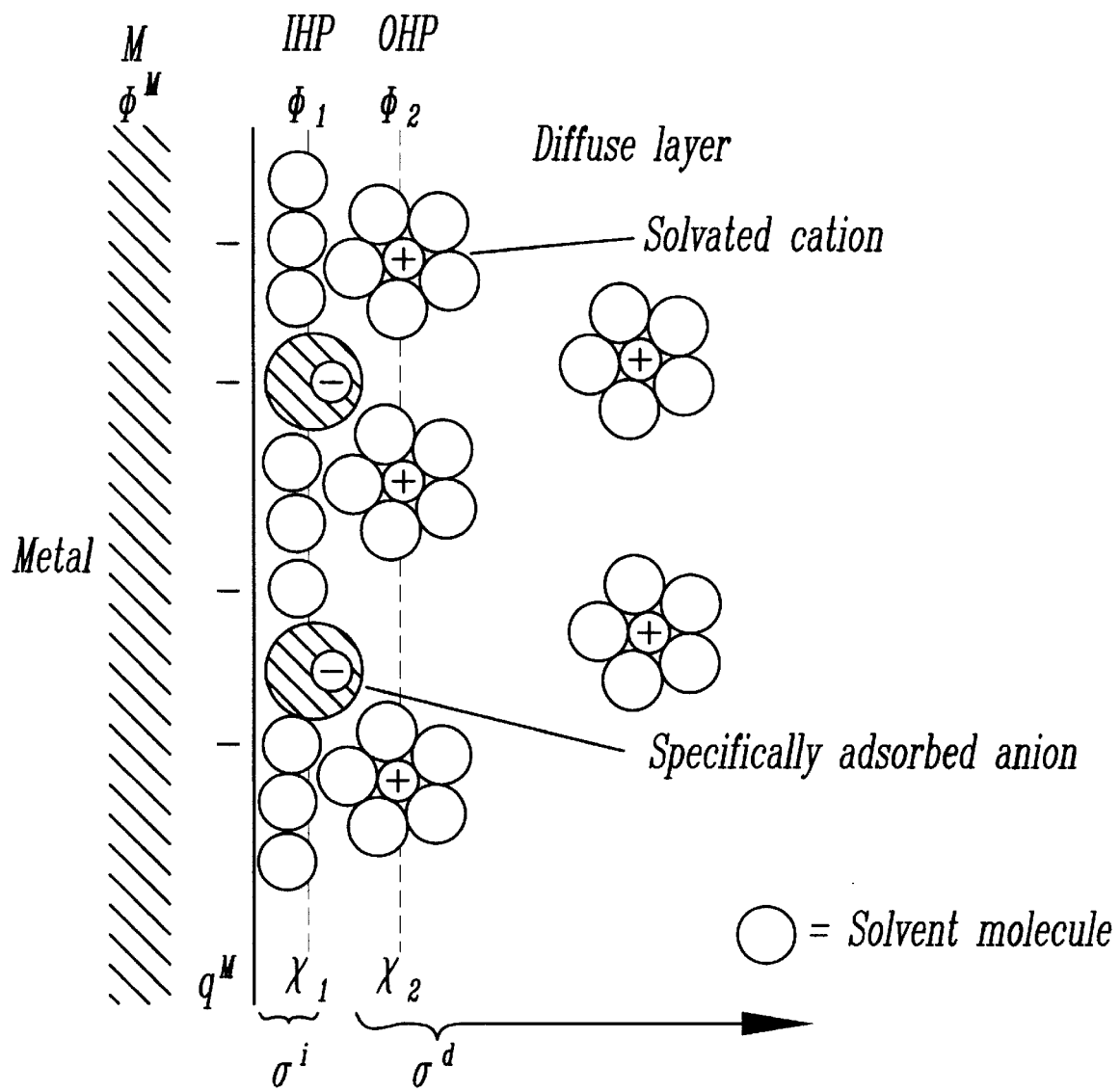
FIG. 2 is a proposed model of the electrode-solution, double-layer region (from Reference 4). IHP and OHP are the 'inner' and 'outer' Helmholtz planes at distances $x_1$ and $x_2$ from the electrode.
Figure 4:
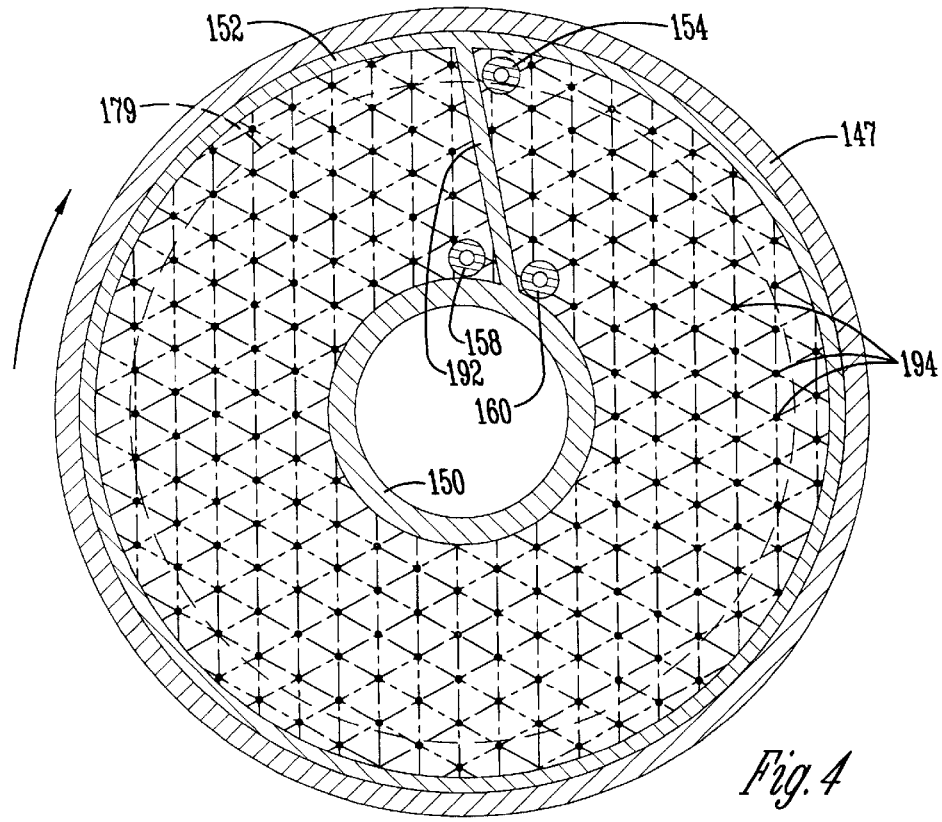
FIG. 4 is a frontal projection of the ELCOR™ deionization device 110 of the Hanak patent, viewed in the direction perpendicular to the end plate of the modules and parallel to its axis.

The preferred configuration of insulating dot or rod electrode spacers is shown in FIG. 4, which is a frontal projection of the ELCOR™ deionization device 110 of the Hanak patent, viewed in the direction perpendicular to the end plate of the modules and parallel to its axis. FIG. 4 is analogous to FIG. 2C in the Hanak patent, with two added features. One of them is that the spacer 192 is inclined away from the direction of rotation with respect to the radial direction. The other feature is that of having an array of dot or rod insulating spacers arranged in a close-packed hexagonal pattern to maintain even spacing between the electrodes.

While such narrow electrode spacing in the ELCOR™ module is possible, it appears that spacing of 0.005 cm to 3.0 cm would be more practical, possibly using spacers at the lower end of the range of separation. It is anticipated that use of spacers might interfere with laminar flow of the concentrate and the diluent fluids and thereby give rise to their mixing. Another expected problem with the spacers is possible increased charge leakage caused by partially electrically conducting films formed on the spacers over a period of time.

Examples of deionization occurring partially in the ELDYN mode, using the Electrogravitation process were discussed above, and were shown in FIGS. 1 and 3. Another example is described next.

Increase in Centrifugal Force. As discussed above, an increase in centrifugal force promotes the ELDYN mode and with it a substantial improvement in the performance parameters of the process. Consequently, the rate of rotation of the ELCOR™ module should be increased to as high a level as is mechanically and economically practical. There appears to be no fundamental limit to the rotational speed or the level of centrifugal force except for the endurance of the mechanical systems, such as the drive system, rotary union, and module components which may be affected by the strength of materials, friction and the like. With substantially enhanced rate of deionization with increasing centrifugal force, it is predicted that the size of the ELCOR™ module may be decreased considerably to achieve equivalent performance, thereby possibly reducing the capital and operational costs of the process.

The centrifugal force, generated by the spinning of the rotor and directed away from the axis, is measured in multiples of the Earth's gravitational force and is known as the "relative centrifugal field (r.c.f.) or 'G force'. Centrifugation, which is a term used for the separation of a large variety of materials, mostly consisting of more than one phase, has been in use for well over 100 years [7]. Centrifugation has also been applied to the separation of materials in single phase, including gases [8] and liquids. Remarkable progress in the development of advanced centrifuge rotors occurred during World War II, in conjunction with the separation or enrichment of nuclear isotopes, notably of uranium 234 and of plutonium [8]. The advent of zonal centrifuges and the density-gradient method has facilitated the mass separation of subcellular particles including viruses [9].

Centrifuges of special interest in the instant invention are the zonal centrifuges designed for a continuous operation, in which the liquid to be processed is continuously fed in and the separated materials are continuously removed. They are cylindrical rotary devices, having a hollow annular chamber, equipped with two or more radial walls so as to form two or more separate chambers. This construction facilitates maintaining the feed liquid essentially at rest with the rotor, except for the effects due to the Coriolis force and to pumping the liquids into and out of the device.

The first zonal centrifuge was built by N. G. Anderson at Oak Ridge National Laboratory, where over 50 different zonal centrifuge rotors have been developed and evaluated [9]. Seven zonal rotor series for different applications have been developed, ranging from low speed of 1000 RPM to ultra high speeds of up to 150,000 RPM. The r.c.f. developed in these rotors ranged from 152 to 994,000 G. These rotors were relatively small devices, ranging in capacity from less than 100 milliliters up to 4000 milliliters. In these devices the capacity varies approximately inversely with the speed of rotation and r.c.f.

At very high speeds and r.c.f. balancing of the zonal rotors is extremely important. That is the main reason for dividing the chamber into two or more equivalent zones (usually an even number) to achieve balance.

The ELCOR™ device in the Hanak patent also makes use of the zonal centrifuge design, however, having only a single zone. This design is adequate for low r.c.f. and/or with relatively small rotor radius. As the r.c.f. is increased, the multi-zonal centrifuge design becomes increasingly desirable. The multi-zonal design is also preferred as the outer radius is increased. In this case the multi-zonal design facilitates shortening the path that the concentrated and depleted liquids must travel to reach the exhaust ports.

Figure 5:
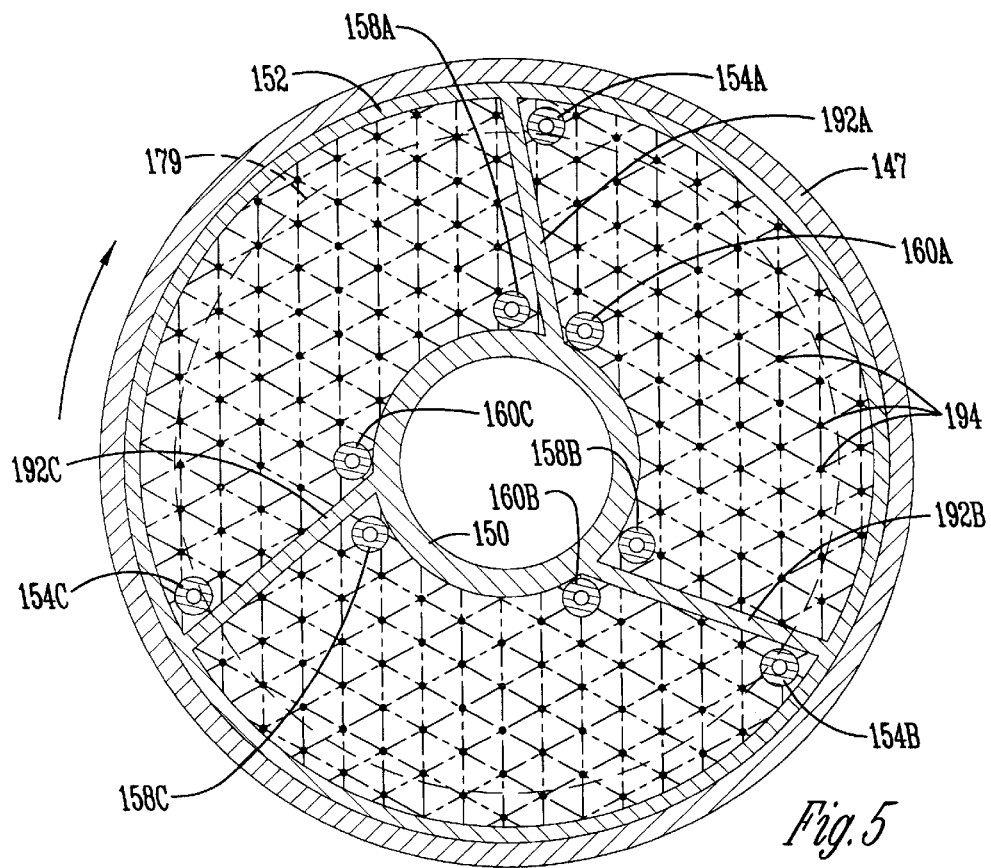
FIG. 5, related to FIG. 4, utilizes a zonal centrifuge design [Ref. 7] for the deionization chamber, which in this case is divided into three equivalent zones.

An example of a multi-zonal ELCOR™ cell or a series of cells is shown in FIG. 5 in which each cell is divided into 3 equivalent zones, each subtending an angle of 120°. This device contains three sets of insulating spacers 192, inlet and outlet ports 154, 158, and 160, each item located 120 degrees from its similar items. In this device the conduits for the feed, the concentrated solution and the depleted liquid are mutually interconnected internally. Thus, the three zones are defined by the insulating spacers 192a, 192b, and 192c. These spacers are shown inclined away from the direction of rotation with respect to the radial direction, which along with the inner and outer annular insulating spacers 150 and 152 prevent the liquids therein from incursion into the neighboring zones. Each zone is also equipped with three sets of feed liquid inlets 160a,b,c, concentrated solution outlets 154a,b,c, and depleted liquid outlets 158a,b,c. Not shown are internal conduits interconnecting each set of outlets prior to the discharge of the respective outflow liquids. Also shown in FIG. 5 is an array of optional insulating dot or rod electrode spacers 194 as in FIG. 4.

In the multi-zonal ELCOR™ design it is preferable to combine the spacers 192a,b,c with the annular insulating inner spacers 150 and the annular insulating outer spacers 152 into a single, integrated spacer, thereby facilitating its fabrication, installation and stability. As in the Hanak patent said integrated spacer can be fabricated of neoprene rubber. For greater rigidity, especially at higher rotational speeds and r.c.f., said spacer may be made of a polymer such as high density polyethylene (HDPE), known for its electrical insulating properties and its resistance to many chemicals and water. The integrated spacers may be held in place either by compression or by thin layers of an adhesive or both.

The feed conduits 160a,b,c may also be internally connected to a common feed conduit or they may be connected to separate conduits in the rotary union discussed in the Hanak patent.

New Potential Applications. The multi-zonal design of the ELCOR™ will facilitate the use of high r.f.c. and/or rotors having large diameters. This design, along with the ELDYN mode will facilitate new applications. Heretofore only the density gradient medium, which provides varying density along a column of varying r.c.f. has been available to assist with the separation of different species in combination with high centrifugal force. In the case of the ELCOR™ process a new, powerful assistance for enhanced separation of a variety of biological and chemical species will be afforded by the use of electric field.

EXAMPLE

Deionization of 0.01 molar $NaNO_3$ in the ELCOR™ Device.

The ELCOR™ process operating in the ELDYN mode is currently under development. The first successful result is reported next.

The ELCOR™ module in this test was of the type depicted in FIGS. 2A, 2B, 2C, 2D1B and 2D2 appearing in the Hanak patent. It utilized 3 cells, equipped with 4 annular, high-surface-area (HSA) supercapacitor electrodes, connected in electrical series, but with liquid flow in parallel. The ELCOR™ device used external pumps for the concentrate and the diluent; gravity flow was used for the feed. The test conditions were as follows. The rate of rotation was 1350 RPM which corresponds to a r.f.c. of 173 G (i. e., 173 times the force of gravity) at a mean radius of 8.51 cm. The flow rates of the diluent and of the concentrate were 32.7 and 86.8 mL/min, respectively, and the feed rate was 119.5 mL/min. The apparent surface area of one side of each HSA electrode was 321 cm². The spacing between each pair of electrodes was about 0.288 cm.

Figure 1:
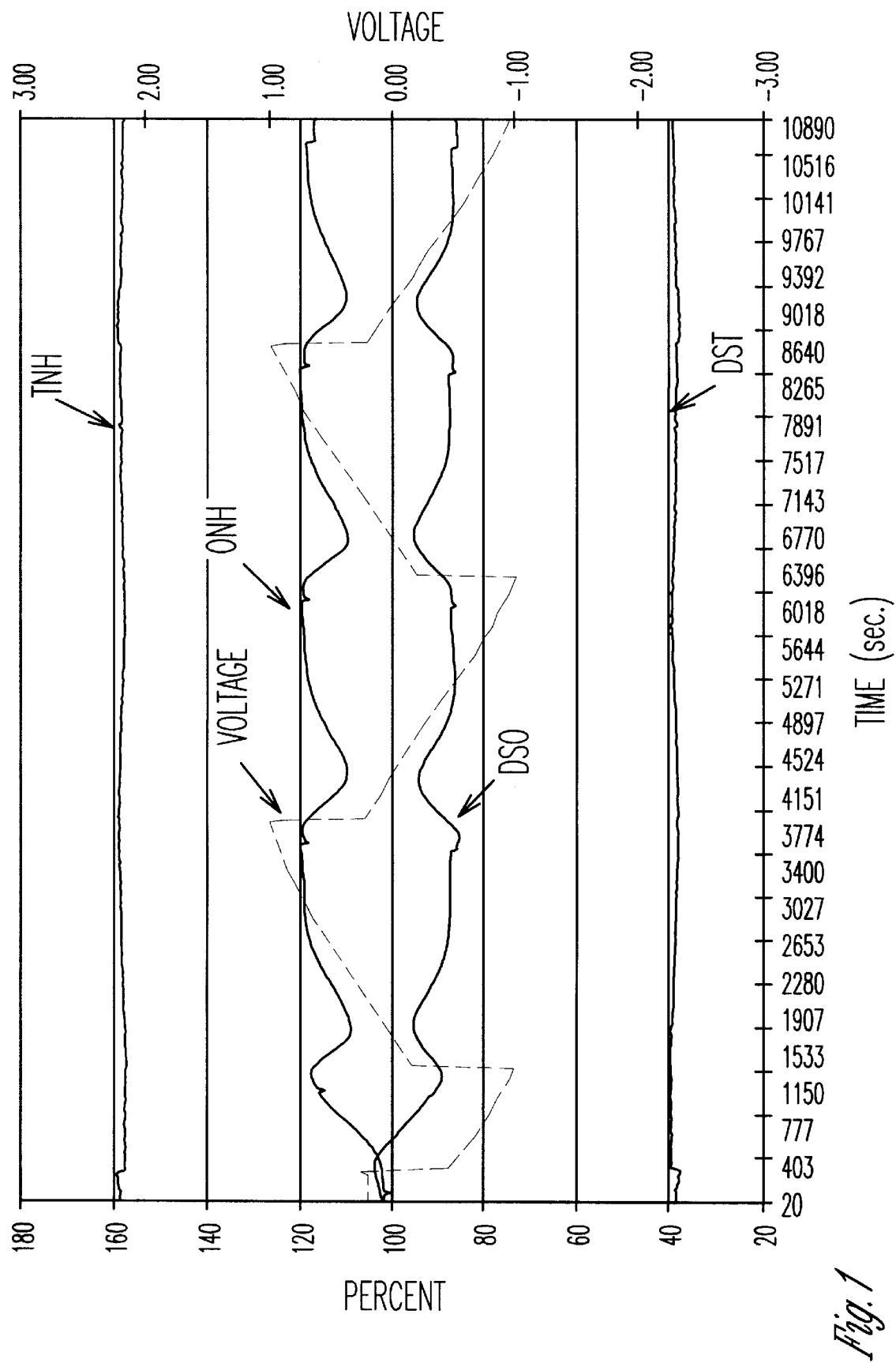
FIG. 1 is a dynamic EG deionization of 0.01 M $H_2SO_4$ in the electrostatic mode utilizing reversible high-surface-area electrodes. Other conditions are: process current=35 mA; $V_{max.}$=1.0 Volt; diluent flow rate=1.85 mL/min; concentrate flow rate=1.85 mL/min.
Figure 3:
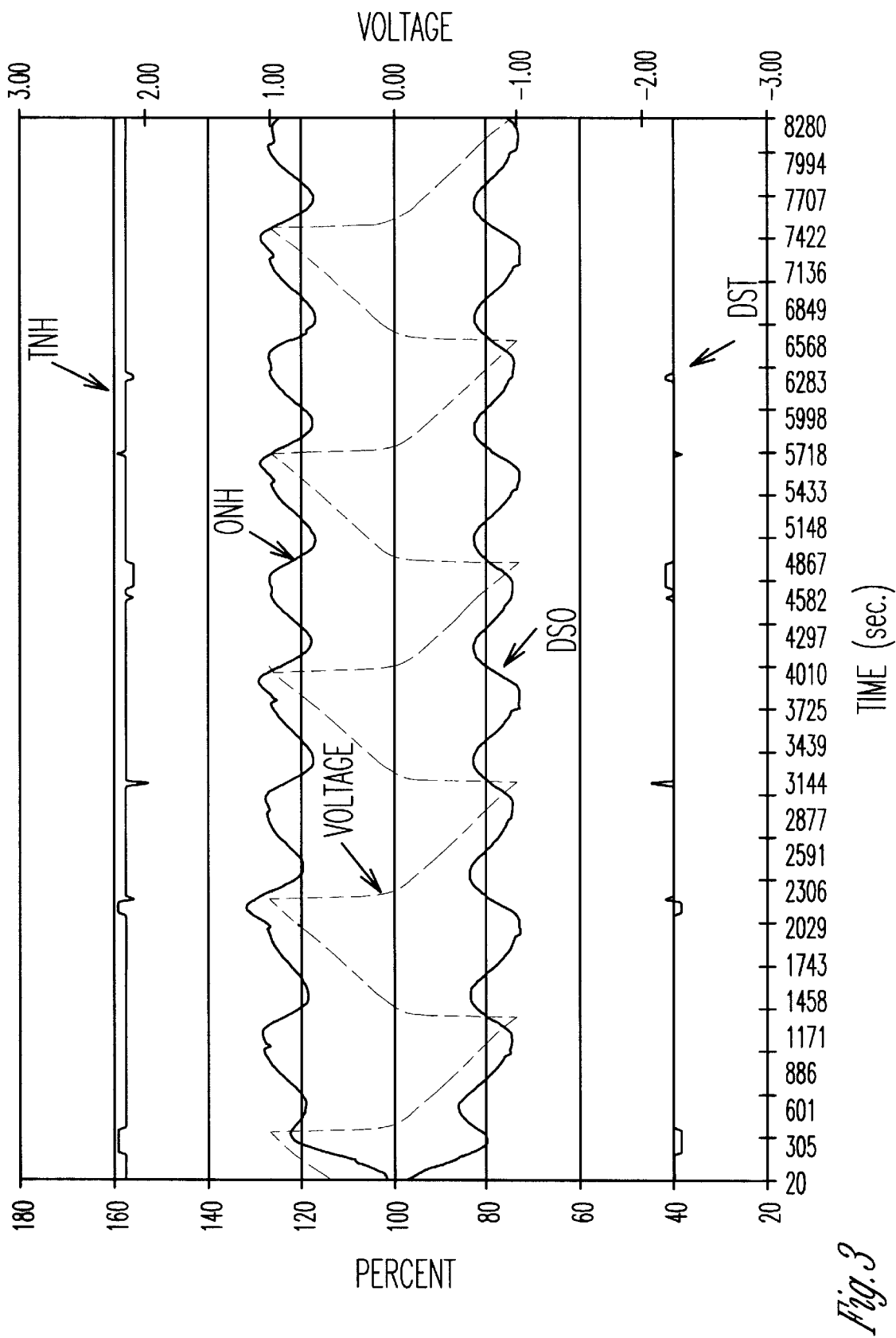
FIG. 3 is a dynamic EG deionization of 0.01 M $CaCl_2$ in the electrostatic mode utilizing reversible high-surface-area electrodes. Other conditions are: process current=35 mA; maximum process voltage ($V_{max.}$)=1.0 Volt; diluent flow rate=1.85 mL/min; concentrate flow rate=1.85 mL/min.
Figure 6:
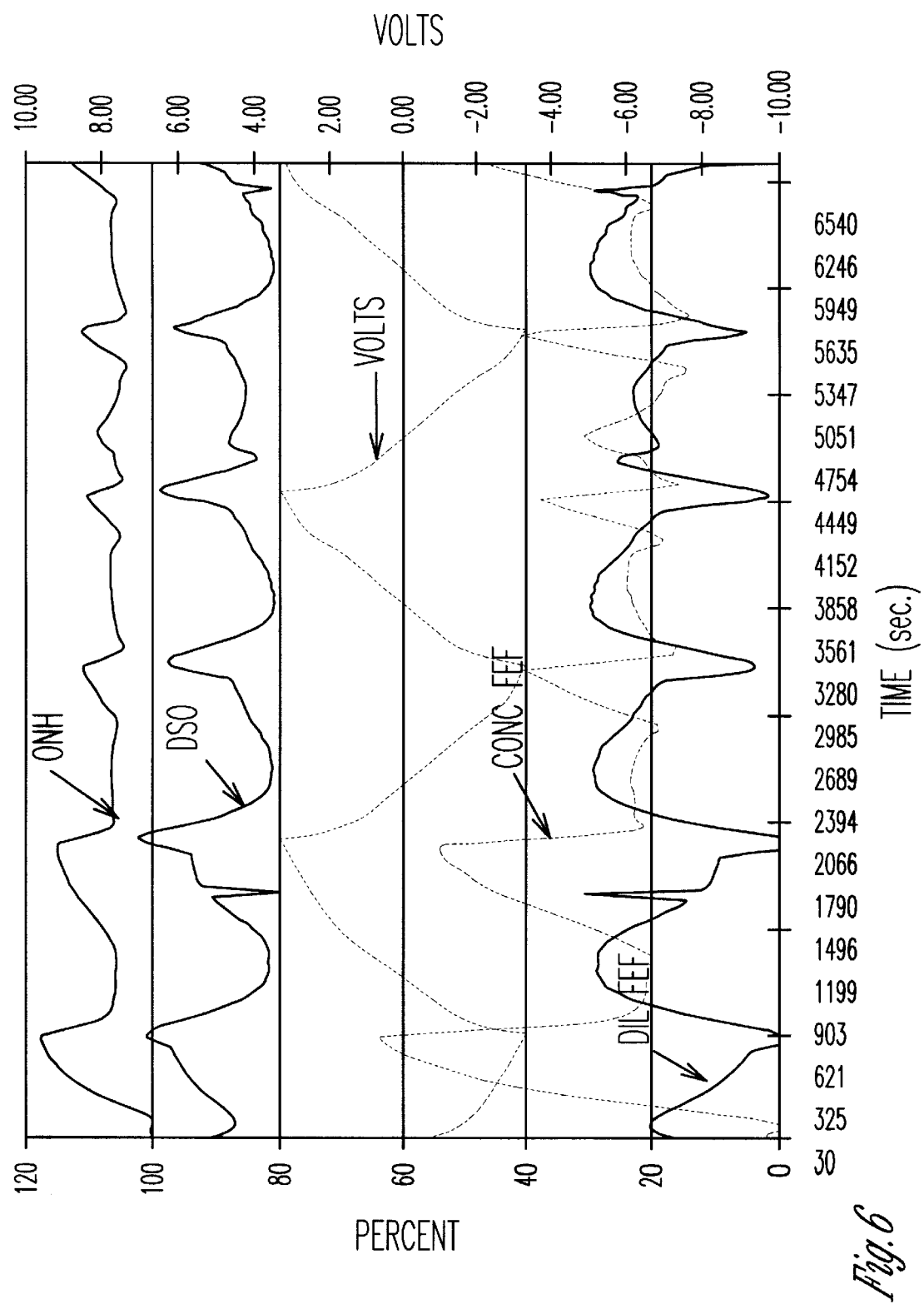
FIG. 6 shows graphical data for the first successful experiment of the ELCOR™ process operating in the electrostatic mode. The data show clearly the existence of both the electrostatic and the ELDYN modes.

The procedure used for the application of electric power was the one used in the electrostatic mode, namely, one of constant current and switching of polarity when limiting voltage is reached, the same as in the electrogravitational (EG) experiments of FIGS. 1 and 3. In this experiment the voltage limit and the average process current were set at 1.0 Volt and 130 mA, respectively. The data for this experiment are shown in FIG. 6. Comparison of FIG. 6 with FIGS. 1 and 3 reveal significant differences. Whereas in FIGS. 1 and 3 the DSO and ONH were essentially symmetrical with respect to the 100% feed line, an entirely different behavior occured in FIG. 6. In the first part of each new pulse, in the range of low voltage, the DSO increases from about 100% to a maximum (i.e., it reaches the minimum concentration) while the ONH decreases to a minimum, (i.e., it also goes through a minimum concentration. As the DSO passes the maximum value, the ONH starts increasing with increasing voltage at a fast rate, reaching a maximum (i.e., it reaches maximum concentration) at the point of the switching of polarity. The DSO reaches its minimum value (i.e., also its maximum concentration at the same point. Thus, in the ELCOR™ operation, the DSO and the ONH curves are asymmetrical as opposed to the EG operation.

FIG. 6 has additional set of two curves shown. One curve is DIL FEF and the other is CONC FEF, which are the Faradaic efficiencies for the diluent and the concentrate, respectively. The data indicate that the maxima in the diluent coincide with the minima in the concentrate and vice versa. Significantly, the first maximum in the CONC FEF reached a value of 64%, exceeding by 20% the highest value of 44% shown in FIG. 8 of the Hanak patent for the deionization of copper sulfate by the ELCOR™ process in the electrolytic mode. The 64% value also exceeds any CONC FEF values observed in the electrostatic mode in the EG process. Thus, the predicted higher performance has been substantiated.

Other features in FIG. 6, following the first pulse, are nearly equivalent DSO and DIL FEF for pulses 2, 3, 4, and 6, while pulse 5 is substantially different, apparently having undergone an anomalous event. By comparison, the values of ONH and CONC FEF for the same pulses show variation. The most likely reason is that a leak had occurred in the rotary union, admixing varying amounts of the feed liquid into the concentrate.

A proposed explanation to the data in FIG. 6 is that in the first part of each pulse, at lower voltage, charging of the electrodes is predominantly taking place, meaning that the electrostatic mode prevails. In the second part of the pulse, at higher voltage, it is clear that the ELDYN mode predominates. This sequence of the occurrence of the electrostatic and the ELDYN modes suggests that the HSA electrodes should be at least partially populated by the ionic species in order for a significant rate of the sliding of the diffuse layer to occur. This partial population occurs automatically upon the application of voltage to discharged electrodes.

The reason that a "pure" ELDYN mode is not observed is that the current used was higher than that allowed by the magnitude of the centrifugal force.

The average values of DSO and ONH calculated for the final pulse, number 6, were 87.1% and 106.8%, respectively, compared with the relative concentration for the feed of 100%. Thus, enhancement and deionization are approximately inversely proportional to the flow rates.

The average Faradaic efficiencies for the diluent and the concentrate were 17.5 and 24.5%, for an average FEF of 21.0%. The two values should be the same as the average; in fact the difference is relatively small.

Although the process in this example has not been optimized, the current density was about 74% higher than that in an EG cell operating in partially electrostatic and partially ELDYN mode, thereby providing another proof of concept.

REFERENCES

1. Oren, Y., and Soffer, A., "Electrochemical Parametric Pumping," *J. Electrochem. Soc.* 125, 869–875 (1978).
2. Oren, Y., and Soffer, A., "Water Desalting by Means of Electrochemical Parametric Pumping. I. The Equilibrium Properties of a Batch Unit Cell," *J. Applied Electrochem.* 13, 473–487 (1983).
3. Joseph Farmer, "Method and Apparatus for Capacitive Deionization, Electrochemical Purification, and Regeneration of Electrodes," U.S. Pat. No. 5,425,858, Jun. 20, 1995.
4. Bard, A. J. and Faulkner, L. R., *Electrochemical Methods, Fundamentals and Applications*, John Wiley & Sons, New York (1980).
5. Tong, Robert, et al. U.S. Pat. No. 5,384,685, Jan. 24, 1995.
6. Tong, Robert R., et al. U.S. Pat. No. 5,464,453, Nov. 7, 1995.
7. Hsien-Wen Hsu, Separations by Centrifugal Phenomena, in Techniques of Chemistry, Volume XVI, Edmond S Perry, editor, A John Wiley & Sons, New York, Chichester, Brisbane, Toronto, 1981.
8. H. D. Smyth, *Atomic Energy for Military Purposes*, Princeton University Press, Princeton, N.J., (1945).
9. N. G. Anderson, *Quarterly Review of Biophysics*, 1, [3], 217 (1968).

What is claimed is:

1. A rotary electrolytic apparatus for separation of ionizable substances from liquid solutions by the combined action of electric current passing through a liquid solution and of compound centrifugal force, also known as Coriolis force, whereby the liquid solution treated is separated in the form of a concentrated solution of solute and of a depleted solution containing mainly solvent, comprising:

a container having an axis of rotation and having a connection to operatively connect the container to a source of rotational power;

one or more sets of electrodes forming a group of electrodes, the group having outermost electrodes, each set forming an electrolytic cell and positioned in the container in a manner that allows rotation of the set about the axis of rotation, the electrodes of each set being spaced apart along the axis of rotation and including insulating and sealing spacers between electrodes at or near the perimeter and center of each electrode, the electrodes and spacers defining a space therebetween which functions as an electrolytic cell;

a fluid inlet to each cell to supply the liquid solution to be treated from a feed fluid source;

a source of constant electrical voltage;

a pair of electrical connections operatively connected respectively to the outermost electrodes of said group of electrodes to connect said outermost electrodes to a source of electrical power at a constant voltage;

a concentrated solution outlet in each cell positioned at a location in the cell that corresponds with an accumulation of concentrated solution caused by Coriolis force during rotation of the container; and a depleted solution outlet in each cell positioned at a location in the cell that corresponds with an accumulation of depleted solution caused by Coriolis force during rotation of the container.

2. The apparatus of claim 1 wherein each cell has a bar extending from said center sealing spacer either radially and sealingly through the cell, or at an angle of greater than zero and less than 90 degrees from the radial direction, in a direction away from the direction of rotation, the bar having a leading side pointed opposite to the direction of the rotation of the cell and a trailing side pointed in the direction of rotation of the cell, and the fluid inlet positioned near the inner periphery of the cell and near the trailing side of the bar, and the concentrated solution outlet located toward the outer periphery of the cell and near the trailing side of the bar, and the depleted solution outlet located toward the inner periphery of the cell and near the leading side of the bar.

3. The apparatus of claim 2 wherein each cell has two or more insulating bars extending from said center sealing spacer either radially and sealingly through the cell, or at an angle greater than zero and less than 90 degrees from the radial direction, in a direction away from the direction of rotation, said bars having a leading side pointed opposite to the direction of the rotation of the cell and a trailing side pointed in the direction of rotation of the cell, and two or more fluid inlets positioned near the inner periphery of the cell and near the trailing side of the bars, and two or more concentrated solution outlets located toward the outer periphery of the cell and near the trailing side of the bars, and two or more depleted solution outlets located toward the inner periphery of the cell and near the leading side of the bars.

4. The apparatus of claim 3 wherein said concentrated solution outlets and the depleted solution outlets are internally connected to their respective common conduits, and said fluid inlets are internally connected to their common conduit or connected to separate, individual conduits.

5. The apparatus of claim 3 wherein said insulating bars and said insulating and sealing spacers between electrodes at or near the perimeter and center of each electrode form a single, integral spacer, said spacer defining two or more equivalent chambers or zones between a pair of adjacent electrodes.

6. The apparatus of claim 5 wherein the integral spacer is made of a material selected from a variety of pliable, water-impermeable substances, including natural or synthetic rubber or organic polymers including high density or low density polyethylene, polypropylene, polyester and the like.

7. The apparatus of claim 2 wherein the electrodes are connected in electrical series by conduction of electricity through the liquid solution from electrode to electrode but the liquid solution is introduced and removed in parallel from each cell defined by each set of electrodes.

8. The apparatus of claim 1 wherein the electrodes are generally planar and annular, and are generally centered on and perpendicular to the axis of rotation.

9. The apparatus of claim 1 wherein the source of constant electrical voltage delivers d.c. electrical power to the electrical interconnections.

10. The apparatus of claim 9 including an electrical current control operatively connected to the source of constant electrical voltage to reverse polarity of the electrodes after a designated time interval.

11. The apparatus of claim 10 wherein the designated time interval is a function of the need to clean the electrodes, which may be indicated by a decrease in the level of deionization and concentration.

12. The apparatus of claim 10 wherein the designated time interval is at least twice as long as that needed to switch the polarity in the electrostatic mode, thereby saving energy used in charging and discharging of the electrodes and enhancing the performance of the process.

13. The apparatus of claim 1 wherein the desired minimal spacing between the electrodes is equal to or greater than 0.005 centimeter and equal to or less than 3.0 centimeters and wherein the electrodes are kept at a uniform distance by means of optional narrow insulating dots or rods, affixed to one of each pair of facing electrode surfaces in each cell and uniformly interspersed in between the electrodes, said dots or rods being arranged preferably in a hexagonal close-packed pattern, said pattern having its origin at the center of the axis of rotation of the ELCOR™ deionization module, said pattern being a projection of a honeycomb pattern, with spacers placed at the intersections of the projected honeycomb walls and also at the center of each projected honeycomb cell.

14. Apparatus of claim 13 wherein the uniform spacing between the insulating dots or rods ranges between 10 times to 50 times the height of said insulating dots or rods.

15. Apparatus of claim 13 wherein the insulating dots are formed on the electrode surfaces by printing adhesive material such as epoxy resin and wherein the insulating rods are attached to the electrode surfaces by means of similar epoxy resin.

16. The apparatus of claim 1 further comprising sensors for continuously monitoring the process, the sensors being selected from the set comprising voltage probes, current probes, conductivity electrodes, pH cells, nuclear radiation probes, and flow-rate cells.

17. The apparatus of claim 16 further comprising an automated means of process monitoring and control, the automated means comprising one or more devices selected from the set comprising a conductivity meter, pH meter, ammeter, voltmeter, flow rate monitor, nuclear radiation monitor, a data acquisition system and a microcomputer.

18. The apparatus of claim 1 wherein the process is continuous, and wherein the liquid solution to be processed is continuously fed in and the concentrated and depleted solutions continuously removed.

19. The apparatus of claim 1, wherein concentration and the depletion of the dissolved ionizable solute take place in an electrodynamic, or ELDYN mode by means of initial, partial charging of the electrode surfaces with ions of opposite polarity by the application of constant voltage;

electromigration of positive and negative ions to the surfaces of the electrodes of opposite polarity at a voltage less than the oxidation-reduction potential of the ionic species present in the solution thereby forming thin liquid sheaths containing concentrated ionic species attracted to the electrodes;

said ionic sheaths, if more dense than the depleted solution, sliding over the surface of the electrodes in the direction of the centrifugal force and under the influence of Coriolis force toward the concentrate solution outlet;

the depleted fluid, if less dense than the concentrate solution, moving in the direction opposite to the centrifugal force and under the influence of Coriolis force toward the depleted solution outlet;

elevated centrifugal and Coriolis forces promoting the sliding of the ionic sheaths, thereby giving rise to increased current, which in turn gives rise to increased deionization throughput and/or levels of deionization and concentration.

20. The apparatus of claim 1 wherein the electrodes are made of activated carbon.

21. The apparatus of claim 1 wherein each electrode comprises an essentially flat, metallic, supporting sheet selected from titanium, zirconium, iron, copper, stainless steel or combinations thereof, said metallic supporting sheet having a thickness of 0.005 cm to 0.05 cm and coated on each flat surface which faces another electrode, with an electrically conductive layer of one of carbon or at least one metal oxide having a porous high specific surface area independently selected from metal oxides of the group consisting of the transition metals in groups 4 to 10 in the Periodic Chart of the Elements (new IUPAC notation) and the lanthanides, wherein the thin carbon or metal oxide coatings has a thickness between about 0.1 and 100 microns and a specific area in excess of 300 meter$^2$ per gram; said electrode being suitable for deionization in the electrostatic mode and in the ELDYN mode.

22. The apparatus of claim 1 wherein each electrode comprises a supporting sheet of titanium metal 0.025 cm thick and having high specific surface area coatings on each side comprising a mixed metal oxide coating of ruthenium and tantalum oxides in equal molar ratios, said electrode being suitable for deionization in the electrostatic mode and in the ELDYN mode.

23. The apparatus of claim 1 wherein each electrode comprises a material generally used in supercapacitors or ultracapacitors including a porous coating having a specific surface area in excess of 300 meter$^2$ per gram, said electrode being suitable for deionization in the electrostatic mode and in the ELDYN mode.

24. A method for continuous separation of ionizable substances by an electrodynamic process from liquid solution into a concentrated solution of a solute and of a depleted solution containing mainly solvent comprising the steps of:
 continuously feeding said liquid solution into a rotatable chamber containing one or a plurality of electrolytic cells, capable of separation of ionizable substances from liquid solutions by the combined action of electric current passing through the liquid solution and of Coriolis force;
 rotating said chamber to create centrifugal force substantially greater than two times the magnitude of the gravitational force;
 applying a constant limiting voltage across the cell or cells, less than the oxidation-reduction potential of the ionic species dissolved in the process liquids to cause the current to flow at a level directly dependent on the magnitude of the centrifugal force, on the wet or real surface area of the electrodes, and on the concentration of the liquid and inversely dependent on the spacing between the adjacent electrodes of each cell;
 separately and continuously discharging the concentrated and depleted solutions; and including the voltage, the current, and the flow rates, temperature and the ionic concentration of the solutions.

25. The method of claim 24 further comprising a scalable water-treatment process suitable for the treatment of water containing elevated concentrations of ionizable solutes to recover water suitable for reuse, including water for drinking, water for farm production including irrigation and watering of animals, and for industrial production.

26. The method of claim 24 further comprising a water treatment process suitable for concentrating the dissolved ionizable solute in a liquid form to facilitate recovery of valuable components or the disposal of hazardous substances.

27. The method of claim 24 further comprising periodically changing the polarity of the voltage to clean the electrodes as needed.

28. The method of claim 24 further comprising a water treatment process suitable for demineralization of natural brackish water and sea water.

29. The method of claim 24 further comprising a water treatment process suitable for the separation of heavy metal ions and toxic anions present in mine waste water and in industrial waste water streams.

30. The method of claim 24 further comprising a water treatment process suitable for the separation and concentration of ionizable radioactive nuclides to facilitate their safe storage.

31. The method of claim 24 further comprising a water treatment process suitable for the separation and concentration of dissolved acids and the recovery of purified water and concentrated acids.

32. The method of claim 24 further comprising a water treatment process suitable for the separation and concentration of ionizable colloidal, biological and chemical species.

33. The method of claim 24 wherein the solvent is water.

34. A method for a continuous separation of ionizable substances from liquid solutions into concentrated and depleted solutions comprising the steps of continuously feeding said liquid solution into a rotatable chamber containing one or a plurality of electrolytic cells capable of separation of ionizable substances from a liquid solution by the combined action of electric current passing through the solution and of centrifugal force; rotating said chamber to create centrifugal force greater than two times the magnitude of the gravitational force; establishing a d.c. current flow through said cell or cells; separately and continuously discharging the concentrated and depleted solutions, controlling the process by monitoring of process parameters including the voltage, current, and the flow rates, temperature and the ionic concentration of the liquids; the improvement comprising:
 applying a constant limiting voltage, less than the oxidation-reduction potential of the ionic species dissolved in the process liquids across the cell or cells to cause the current to flow at a level directly dependent on the magnitude of the centrifugal force, on the wet or real surface area of the electrodes, and on the concentration of the ionic species dissolved in the feed liquid and inversely dependent on the spacing between the adjacent electrodes of each cell;
 performing the deionization of the liquid solution in a rotatable cylindrical deionization apparatus that takes advantage of the Coriolis force in the deionization process;
 performing the deionization with the cells arranged in electrical series, thereby circumventing problems with a high current operation;
 periodically changing the polarity of the current to clean the electrodes;
 conducting the deionization utilizing automated monitoring and control provisions, leading to improved quality control and low labor costs;
 conducting deionization in the ELDYN mode which enables the removal of most ionic species from simple or complex solutions.

35. An apparatus for removing ionizable substances from fluids comprising:
 a container having a rotational axis;
 one or more annular chambers in the container, each chamber having a first wall and a second wall;
 the first wall comprising an electrode and the second wall comprising an electrode of opposite polarity to the electrode of the first wall;
 setting the distance between the first and second walls between a minimum, a function of thickness of diffuse layers at surfaces of the electrodes and/or ratio of diluent and concentrate flow rates, and a maximum, a function of practical levels of deionization, concentration, and throughput;
 a radial wall extending through each chamber;
 at least one inlet into each chamber to supply on a continuous basis feed fluid to the chamber;
 a first outlet from each chamber positioned to remove portions of the feed fluid that have been separated by electromigration and Coriolis force;
 a second outlet from each chamber positioned to remove remaining portions of the feed fluid; and the first outlet placed along the outer perimeter of the chamber, the second outlet placed along the inner portion of the chamber.

36. A method of removing ionizable substances from fluids comprising:

feeding a feed fluid comprising a solution which contains said ionizable substances dispersed throughout said solution between two electrodes;

causing electrical current to flow from one electrode through the feed fluid, and to the other electrode;

imparting centrifugal force and motion, centered about an axis of rotation, to the feed fluid;

causing electromigration of ionizable components towards said electrodes;

at intervals of time reversing the polarity of the electrodes as needed to clean the electrodes;

utilizing compound centrifugal force and motion on the feed fluid to cause separation of denser components from less dense components;

removing the denser components to a separate place; and removing the less dense components to a separate place.

37. A rotary apparatus for continuous separation of ionizable substances from liquid solutions to form a concentrated solution containing the solute and of a depleted solution containing mainly the solvent, said apparatus comprising a cylindrical, rotatable deionization chamber containing two or more electrodes electrically insulated from each other, each adjacent pair of said electrodes forming an electrolytic cell in between; a motor for rotating said chamber to produce centrifugal force substantially greater than two times gravitational force; a means of feeding and metering of said liquid solution and a means of exhausting the concentrated and the depleted liquids; a means of delivering a d.c. electrical current to flow through the cells; a means of periodically changing the polarity of said current; said apparatus comprising;

(a) a deionization chamber comprising
   (a1) an enclosure consisting of outer and inner cylindrical members and two annular end plates, the inner surfaces of said chamber being electrically insulating;
   (a2) two or more planar, annular electrodes, mounted coaxially with the deionization chamber, equidistantly from each other and with their planes perpendicular to the axis of rotation of the chamber; said electrodes having a specific surface area higher than the apparent geometric area, and adjacent electrodes being separated from each other by electrically insulating and fluid sealing ring spacers located at the outer and inner peripheries and by a radially-disposed bar spacer touching said rings, that provides a radial wall inside the cell compartment to define front and rear ends of the cell compartment;

(b) a pair of electrical current leads and a pair of voltage probe leads, communicated to the deionization chamber via a slip-ring assembly and being attached to the first and to the last electrodes mounted on the inner side of the end plates of the chamber, whereby in the case of two or a plurality of cells in the electrode assembly, the cells are arranged in electrical series, thereby minimizing the process current and circumventing the need for extra hardware for contacting the rest of the electrodes that would be required for cells interconnected in parallel; wherein during operation, the first and the last electrodes, each having only one side facing another electrode, acquire charges of opposite polarity; upon polarity reversal the electrode polarities are reversed; and all intermediate electrodes assume positive polarity on one side and negative polarity on the other side and vice versa upon polarity reversal by the power supply; and (c) said electrodes having orifices for communicating the feed and the effluent liquids into and out of the cell compartments and the chamber;

(d) said electrodes and cell compartments and feed and effluent orifices are axially and radially co-aligned, and in order to take advantage of the beneficial effects of the Coriolis forces in the deionization process, said feed and effluent orifices of the electrodes are situated as follows: for the feed liquid—in the general proximity of the rear of the electrode compartment and adjacent to its inner periphery; for the concentrate liquid—adjacent to the rear of the electrode compartment and to its outer periphery; for the diluent liquid—adjacent to the front of the electrode compartment and to its inner periphery.

38. The method of claim 37 wherein the feed and effluent liquids are supplied or discharged via a rotary union.

39. The method of claim 37 wherein the feed and the diluent liquids are supplied via a rotary union and the concentrate liquid is discharged centrifugally through an orifice situated in the wall of the deionization chamber at or near its outer periphery.

40. The method of claim 37 wherein the feed liquid is supplied via a rotary union and the effluent liquids discharged centrifugally through orifices situated in the wall of the deionization chamber at or near its outer periphery.

41. The method of claim 37 wherein the flow of two of the liquid streams are effected, regulated and determined by separate metering pumps, the flow of the third stream being effected and regulated by the combined action of the two pumps, and determined by the sum or the difference of the flow of the two metered streams.

42. The method of claim 37 wherein the feed is supplied by the centrifugal pumping action of the device and the effluents are discharged by the same centrifugal action, the flow rates being determined primarily by the size of the orifices in the effluent ports and the pressure created by the centrifugal force.

43. The method of claim 37 wherein the provision for the flow of the feed liquids and for the discharge of the effluent liquids within the cells is such as place the cell compartments essentially in parallel; thereby an increase in the number of cells results in an increase in the volume of the feed liquid treated at the same level of purification.

44. The method of claim 37 further comprising a monitoring and control subsystem that includes sensors and devices for continuously monitoring the process, including at least, but not limited to, a thermometer, conductivity electrodes, conductivity meters, ammeter, volt meter, and flow rate monitors;

an automated means of process monitoring and control, including but not limited to a data acquisition system and a microcomputer;

a direct current power supply to provide process current and voltage;

a computer-controlled electrical switching interface for process power supply, metering pumps, process monitors and controls;

a computer software for capable automated monitoring, control, data logging and performance evaluation of the deionization process.

45. The method of claim 37 further comprising a monitoring and control subsystem that includes:
  sensors and devices for continuously monitoring the process, including at least one of voltage probes, conductivity electrodes, pH cells, nuclear radiation probes, and flow rate cells;
  an automated means of process monitoring and control, including at least one of conductivity meters, pH meters, ammeter, voltmeter, flow rate monitors, nuclear radiation probes, a data acquisition system and a microcomputer;
  a direct current power supply to provide process current and voltage;
  a computer-controlled electrical switching interface for process power supply, metering pumps, process monitors and controls;
  the microcomputer being programmed to perform automated monitoring, control, data logging and performance evaluation of the deionization process.

46. The method of claim 37 further comprising positioning additional deionization chambers added radially or axially with countercurrent liquid flow of the concentrate and the diluent for the purpose of achieving higher degree of deionization and concentration.

47. The method of claim 37 wherein active, exposed surfaces of each of the first and the last electrodes and both surfaces of the intermediate electrodes of the electrode assembly have at least one of the following characteristics, high specific surface area, texture, and chemical composition.

48. The method of claim 37 wherein the feed is supplied by gravitational action.

49. A multi-stage deionization apparatus comprising:
  two or more single-stage electrocoriolysis modules, each module containing one or a plurality of cells, the cells being arranged in an electrical series, having one electrical lead attached to the first electrode and a second lead to the last electrode, and in each single-stage module the flow of the liquid in the cells is in parallel, and each cell in each single-stage has a provision for two inlets and two outlets for the process fluids, with one inlet for the feed or the diluent situated in a rear portion of the cell near the inner periphery, a second inlet for the concentrate situated in a front portion of the cell near the outer periphery, one outlet for the diluent situated in the front portion of the cell near the inner periphery and a second outlet for the concentrate situated in the rear portion of the cell and near the outer periphery;
  the single-stage modules being attached to each other for the process liquids to flow through the assembly in series and with the diluent and the concentrate streams counter-current to each other, and
  the single-stage modules being connected electrically in parallel or connected separately to individual power supplies of constant voltage; and
  the single-stage modules being added in a manner where the number of cells in each module may be the same or different compared with the other modules in the device, and wherein the modules are mounted on a common hub.

50. The apparatus of claim 49 wherein the single-stage modules are added in a radial direction in a concentric manner, such that each additional module has larger inside and outside diameters than the preceding module.

51. The apparatus of claim 49 wherein the single-stage modules are added in an axial direction, such that the inside and the outside diameters may be the same as those of the other single-stage modules.

52. The apparatus of claim 49 wherein the multi-stage device is comprised of single-stage modules each having a separate chamber enclosure.

53. The apparatus of claim 49 wherein the single-stage module may share one chamber enclosure and each pair of adjacent single-state modules may share a common end electrode.

54. The apparatus of claim 49 wherein each common end electrode is connected to a single electrical lead serving both adjacent electrodes, thereby decreasing the number of lead and contacts by nearly one half.

55. The apparatus of claim 49 wherein the single-stage modules are separate devices, interconnected by tubing that also may use auxiliary pumps to communicate the process fluids between the stages.

56. A method of deionization by means of a multi-stage apparatus wherein the feed liquid containing ionizable solute is pumped into a rear inlet near the inner periphery of a first module, filling the deionization apparatus, the multi-stage apparatus is rotated to create centrifugal force, voltage is applied to the electrical leads to cause electric current to pass in series through the cells of each module and in parallel through the multi-stage assembly of modules causing electromigration of the ions to oppositely charged electrodes, periodically reversing polarity and wherein the magnitude of centrifugal force is controlled to control the degree of deionization of the solvent and level of concentration achieved.

* * * * *